United States Patent [19]

Heyche et al.

[11] Patent Number: 5,067,674
[45] Date of Patent: Nov. 26, 1991

[54] CONTROL SYSTEM FOR REMOTE CONTROLLED AIRCRAFT

[75] Inventors: Albert Heyche; Alain Latteur; Philippe Dekoninck, all of Brussels, Belgium

[73] Assignee: Vigilant, Ltd., St. Helier, United Kingdom

[21] Appl. No.: 621,994

[22] Filed: Dec. 4, 1990

[30] Foreign Application Priority Data

Dec. 4, 1989 [FR] France ................................ 89 16088

[51] Int. Cl.$^5$ ........................ B64C 13/20; F41G 7/30
[52] U.S. Cl. ..................................... 244/190; 244/3.14
[58] Field of Search ...................... 244/3.11, 3.14, 189, 244/190

[56] References Cited

U.S. PATENT DOCUMENTS

| | | | |
|---|---|---|---|
| 3,557,304 | 1/1971 | Rue et al. | 244/3.14 |
| 4,071,811 | 1/1978 | Irwin | 244/189 |
| 4,383,661 | 5/1983 | Ottenheimer et al. | 244/3.14 |
| 4,765,567 | 8/1988 | Gutman et al. | 244/190 |
| 4,964,598 | 10/1990 | Berejik et al. | 244/190 |

*Primary Examiner*—Charles T. Jordan
*Attorney, Agent, or Firm*—Harold H. Dutton, Jr.

[57] ABSTRACT

The invention relates to a control system for a remote controlled aircraft. This system comprises on one hand, an substructure on the ground provided with computing means, data acquisition means and radio transmission means, and on the other hand, an on-board apparatus provided with analogous means and sensors for the parameters of the behavior of the aircraft. The substructure on the ground and the on-board apparatus are adapted to exchange data in order to assure the stabilization and the piloting of the aircraft, and the provide specific orders as a function of the application.

4 Claims, 2 Drawing Sheets

CONTROL SYSTEM FOR REMOTE CONTROLLED AIRCRAFT

This invention relates to a control system for a remote control aircraft, in particular a remote controlled helicopter equipped with control servomotors for the manipulation of the collective pitch and cyclic distributor (front/rear inclination, left/right), an uncoupling servomotor and a carburation servomotor.

BACKGROUND AND OBJECTS OF THE INVENTION

Aircraft remote control systems are known which permit control from a distance; however these systems are summary and only permit a direct control of the servomotors without taking other parameters into account. These systems lead to a difficult piloting since the pilot must take into account various interactions: interactions between the machine and the environment, mutual interactions between systems of the machine, and the piloting becomes particularly complex in the case of a helicopter.

The present invention seeks to provide a control system capable of releasing the pilot of the constraints generated by the various aforementioned interactions.

One object of the invention is in particular to assure an automatic compensation of momentary or permanent disturbances, by control of the servomotors for avoiding the aircraft being placed in dangerous positions.

Another object, in the case of a remote control helicopter, is to control in an automatic manner the uncoupling servomotor in order to compensate for the variations in the normal operation of the motor or variations of the collective pitch, this in the goal of assuring in an automatic manner and with the finest manner, the angular stability of the apparatus about the axis of the oscillations.

Another object, always in the case of a remote control helicopter, is to avoid the variations of altitude during banking due to changes of the incident pitch (manipulation of the cyclic plate), while generating in an automatic manner variations of the collective pitch assuring a stability at altitude.

DESCRIPTION OF THE DRAWINGS

The invention will be described in reference to the accompanying drawings which show by way of non-limiting examples, one embodiment of the invention, in which.

DESCRIPTION OF THE INVENTION

The control system provided by the invention comprises (a) an substructure for control from a distance and (b) an apparatus mounted on-board the aircraft. According to the invention, this substructure for controlling from a distance and the on-board apparatus have an architecture and functionalities such as described hereinafter respectively with reference to FIGS. 1 and 2.

The remote piloting substructure (FIG. 1) is generally arranged on the ground, but may also be arranged in a mobil piloting center, for example in an aircraft, a land vehicle, a boat, etc.

Figure 1:
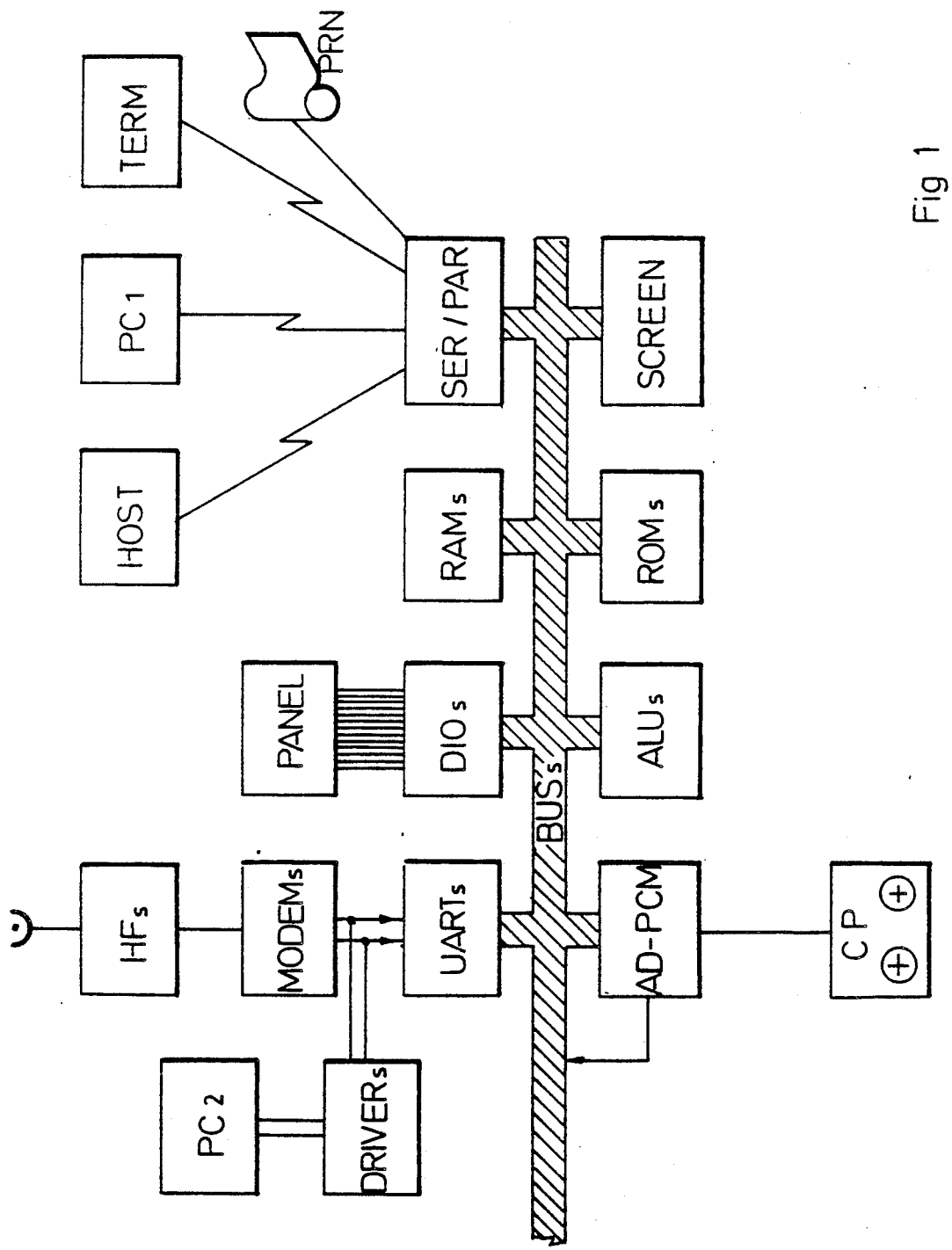
FIG. 1 is a block diagram of the substructure located at a distance from the aircraft for controlling the aircraft.
Figure 2:
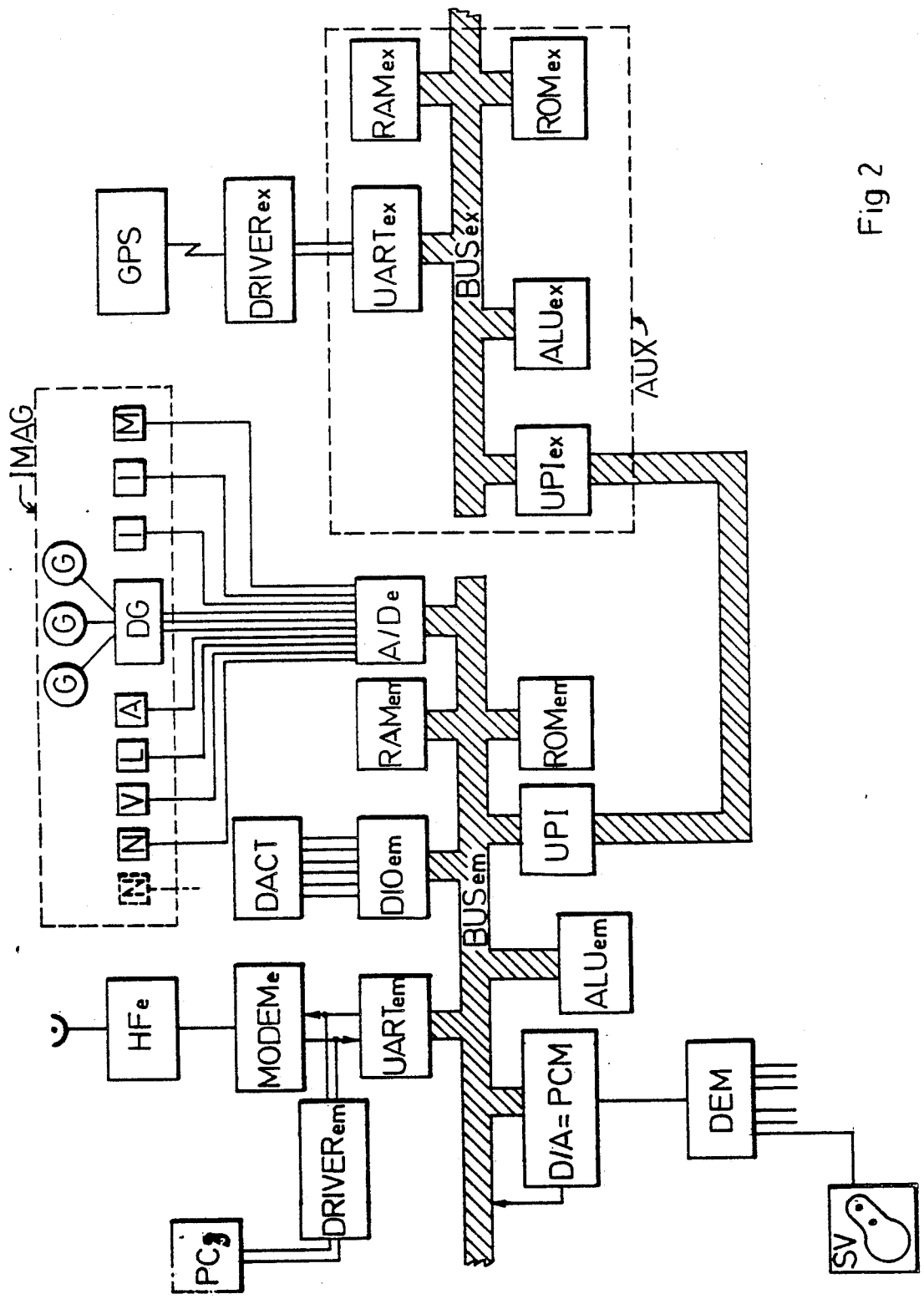
FIG. 2 is a block diagram of the apparatus to be mounted on-board the aircraft.

As shown in FIG. 1, this substructure comprises a piloting console CP adapted to deliver analog signals representative of the piloting record. This console has two piloting sleeves with two degrees of freedom, connected to the control of the pitch, the rolling, the oscillation, and the collective pitch of the helicopter. In a conventional manner, this console is equipped with interrupting switches and potentiometers for permitting a control power emitted, the speed of rotation of the motor and the phases of launching (temperature control).

This piloting console CP is in particular of the "PCM" ("Pulse Code Modulation") or "PPM" ("Pulse Pause Modulation") type delivering analog signals, either modulated in pulse width or modulated in pause width between pulses (of constant width). The signals emitted from this console CP are composed of successive sequences with a determined frequency (for example of 40 Hertz). The console CP may thus be purely analogic and deliver unmodulated analog signals, directly proportional to the piloting standards.

These signals are delivered to an analog/digital conversion unit AD-PCM which converts them to digital data directly accessible by a computer. This conversion unit may in particular comprise an incremental counter which writes in a register and may generate an interruption to a central computing unit, to the rising or falling front of the pulses of the signals received, in order that the central unit may inquire of the value of the incremental counter.

The AD-PCM converter is connected to an address bus -$BUS_s$- for data and for control, particularly of the synchronous type.

A volatile memory unit $RAM_s$ is connected to the bus in order to read and store the digital data transmitted thereby. The capacity of this memory is determined by the size of the address and data bus, particularly 16 bits corresponding to a capacity of the memory of 64 kilooctets.

To the bus -$BUS_s$- is also connected a central computing unit $ALU_s$ adapted to carry out logical operations on the stored data in the $RAM_s$ according to the predetermined processing programs, examples of which are provided below. This computing unit comprises logical operators adapted to work on a string of 16 bits to provide essentially the following operations: basic arithmetic operations, basic conditional and unconditional branching, boolean operations, direct, indirect and indexed access to the memory... The computing power of this unit is on the order of 1 mips (mega instructions per second).

A non-volatile storage unit $ROM_s$ contains the operation programs for the central unit $ALU_s$ which the latter loads via the bus. This memory may have a capacity analogous to the volatile memory $RAM_s$.

Further, an asynchronous communication module $UART_s$ is connected to the bus in order to transform the data issued from the calculating unit to a standard "RS 232" serial signal, and to receive a serial signal and to load the corresponding data into an internal register accessible by the central unit $ALU_s$. This unit $UART_s$ is selected with a transmission flow on the order of 120 kilobits/s. Its frequency of reception and transmission is imposed by the central unit $ALU_s$. It should be noted that the control of this frequency may, if needed, be carried out by an external signal issued by a specific clock.

A modulation/demodulation unit $MODEM_s$ is connected to the module $UART_s$, with the function of modulating the serial signal issued by this module $UART_s$ for the emission, and to demodulate the modulated signals coming from the reception members and to transmit them to the module $UART_s$. The modulation in particular is carried out at an intermediate frequency near a sub-carrier modulating average frequency. This modulation/demodulation is preferably of the FM type at low power, the output signal being adapted to the emission units.

These emission units comprise a radio transmitting-/receiving module $HF_s$, comprised in a conventional manner of a duplexer decoupling the signals emitted by the antenna and the signals received thereby, an FM modulation station transposing the average frequency signals emitted from the $MODEM_s$ into high frequency signals, an FM demodulating station for demodulating the high frequency signals coming from the duplexer and transposing them into average frequency signals adapted to the $MODEM_s$ unit and a high frequency amplifier for amplifying the modulated signals into HF (40 to 200 watts under 50 ohms).

The substructure may also advantageously be equipped with an adaptation module $DRIVER_s$ permitting assurance of the compatibility between the module $UART_s$ and a personnel computer $PC_2$ intended for verification tests. This module $DRIVER_s$ may be of the "MAX 239" type. The computer $PC_s$ may be used for controlling the quality of the hertzian bundle with the on-board apparatus (extraction of statistical parameters such as the percentage of messages to repeat, the percentage of errors ...).

Additionally, the substructure comprises a binary input/output port $DIO_s$, connected to the bus to be ordered or controlled by the central unit $ALU_s$. This port is provided at the output with a series of binary status lines which are either read for loading the internal registers, or modified from the contents of these registers.

A set of binary actuators and sensors PANEL is connected on the binary lines for either arranging the actuators in the configurations corresponding to the states of the lines, or translating on the lines the states of the sensors. For example, several actuators may be comprised of alarm diodes changing state when the calculating unit $ALU_s$ has detected data corresponding to a minimum oil level on the helicopter, a motor temperature which is too high, an ambient temperature in the helicopter which is too high, mechanical constraints which are too high, an altitude which is too low, or an abnormal speed of rotation of the motor. Moreover, several sensors may be provided with interrupters, push-buttons, a two-stage discontinuous control stick, which are at the disposition of the pilot in order that the central unit $ALU_s$ may send particular instructions to the helicopter, for example controlling a camera on-board the helicopter (starting, controlling the telephoto lens, controlling the orientation), releasing a parachute, changing the mode of piloting. . .

Further, a series/parallel communication module SER/PAR is connected to the $BUS_s$ for achieving exchanges of data between the central unit $ALU_s$ and the peripherals, in particular the personal computer $PC_1$, the pocket terminal TERM, the printer PRN, the host computer HOST. This SER/PAR module is essentially comprised of a multiprotocol communication processor, address decoders for reading and writing in the specialized registers of the communication processor, and adaptation modules (analogous to the $DRIVER_s$ module already mentioned). This module permits complete integration of the system described with conventional information processing for a control or an action on this system. For example, a bank of geographic data may be consulted by the computer HOST in order to constitute a file of trajectories, this being remotely loaded into the on-board apparatus via the substructure on the ground. The personnel computer $PC_1$ may permit a digital visualization of the altitude data of the aircraft.

Further, a screen management peripheral SCREEN may be connected to the central unit $ALU_s$ through the bus for visualizing the data in real time, especially in a graphic form.

The apparatus mounted on-board the aircraft is installed in a rigid chassis, resistant to shock, and electrically, electromagnetically and mechanically insulated. As shown schematically in FIG. 2, this on-board apparatus comprises a radio transmitting/receiving module $HF_e$ forming with the module $HF_s$ a hertzian bundle. This module adapted to transmit and receive modulated signals is similar to module $HF_s$.

This module $HF_e$ is connected to a modulation/-demodulation unit $MODEM_e$ similar to the unit $MODEM_s$, this module being adapted to modulate a series signal in the low band and transmit it at intermediate frequency to the module $HF_e$, and for demodulating the intermediate frequency signals coming from the module $HF_e$ and delivering serial signals in the low band to an asynchronous communication module $UART_{em}$.

This module $UART_{em}$ is connected to a bus $BUS_{em}$ for transforming the data presented on this bus into a serial signal for transmitting to the module $MODEM_s$, and for receiving the serial signal issued by the unit $MODEM_e$ and converting it into data which is loaded into an internal register.

This apparatus also comprises a volatile memory unit $RAM_{em}$ similar to the unit $RAM_s$ for storing digital data.

A central calculating $ALU_{em}$ is connected to the $BUS_{em}$ in order to provide logical operations on the stored data. This unit is similar to the unit $ALU_s$; as with that unit, it is particularly arranged to have access to the internal register of the module $UART_{em}$. A non-volatile memory unit $ROM_{em}$ contains the operation programs of the central unit $ALU_{em}$.

In addition, a digital/analog conversion unit D/A-PCM is connected to the bus $BUS_{em}$ for generating a composite analog control signal from the data treated by the calculating unit $ALU_{em}$ and presented by the bus. This unit comprised of retarders and interruption generators is in particular adapted to generate a composite signal under the form of frames of pulses, width modulated at a predetermined frequency, especially 40 hz.

This composite signal is demultiplexed and shaped in the demodulator DEM which delivers on several lines simple analog signals (modulated in "PEM" or "PPM") directly understandable by the servomotors SV of the aircraft.

A binary input/output port $DIO_{em}$ is connected on the bus $BUS_{em}$ to be ordered or controlled by the central unit $ALU_{em}$. This port is provided at the output with a series of binary status lines which are, either read for loading the internal registers, or modified from the contents of these registers. The lines of this port art connected to a set of binary actuators and sensors DACT which present command or control states through said port. For example, the actuators are comprises of electronic interrupters for the ignition system, search lights, parachute release, blocking of the motor ignition; several sensors may be comprised of temperature, oil level gauges, in order that the corresponding digital parameters may be transmitted to the substructure on the ground.

The apparatus comprises further a set of sensors IMAG comprising inclinometers I, magnetometers M, accelerometers A, gyrometers G, altimeters L, speed indicators V, and various indicators indicated as N such as tachometers, fuel gauges, alternator charging indicators, etc. which provide analog signals representative of the position, of the behavior of the aircraft and of its internal parameters. The inclinometers, particularly two in number, each deliver in the form of analog voltage a signal representative of the inclination, or of the pitch, or of the roll of the aircraft. The magnetometer delivers an analog signal representative of the magnetic heading of the aircraft. The accelerometers, three in number, each provide in the form of analog voltage a signal representative of inertial acceleration of the aircraft about the three axes. A low-pass analog filter permits releasing of the aircraft vibrations. The gyrometers, three in number, are particularly comprised of linear magnetic inductions displacement sensors, for example of the "LVDT" type ("Linear Vertical Displacement Transducer") coupled to a rotating mass. Each sensor when it is excited by an excitation signal delivers a phase modulated signal, an image of the angular displacement of the gyrometer. This signal is demodulated in a gyroscopic demodulator DG for delivering an analog voltage representative of the angular speed of the aircraft about its three axes.

The analog signals from the sensors IMAG are sampled and digitized in a multichannel analog/digital converter A/D$_e$ for loading the corresponding digital data into the internal registers accessible by the central unit ALU$_{em}$ which places them in the memory unit RAM$_{em}$. This converter A/D$_e$ is adapted to provide digital data with 11 bits of precision.

The on-board apparatus may advantageously be equipped with an adaptation module DRIVER$_{em}$ permitting assuring the compatibility between a UART$_{em}$ module and a personal computer PC$_3$ for verification tests when the aircraft is on the ground. This module is particularly of the "MAX 239" type. The computer PC$_3$ may be used for controlling the quality of the hertzian bundle with the substructure on the ground, for carrying out a control of the operation of the different systems of the aircraft.

In addition, a universal interface UPI is connected on the bus BUS$_{em}$ for providing the exchanges of data between the central unit ALU$_{em}$ and the auxiliary peripherals AUX having an interface UPI$_{ex}$ compatible with the interface UPI.

In particular, the interface UPI may be connected to an auxiliary processor AUX comprising essentially a calculating unit ALU$_{ex}$, a volatile memory unit RAM$_{ex}$ for the storage of the intermediate results, a non-volatile memory unit ROM$_{ex}$ containing the operation programs of the calculating unit ALU$_{ex}$, an asynchronous communication module UART$_{ex}$, an adaptation unit DRIVER$_{ex}$ adapted to assure the compatibility between the communication module UART$_{ex}$ and a geodesic data acquisition module GPS. The modules or units of this auxiliary processor have identical operations to those described previously. The module GPS is of the "Global Positioning System" type which deduces the geodesic coordinates, the signals sensed from a GPS network of geostationary satellites. The geodesic coordinates are generated in a series form by the module GPS and are representative of the latitude, longitude, altitude and spatial speed of the aircraft. This auxiliary processor has for its object to download the central unit ALU$_{em}$ of specific calculations of navigation, essentially mathematic, and to store in its memory RAM$_{ex}$ the data originating from the substructure on the ground in order to unload the memory RAM$_{em}$.

DETAILED DESCRIPTION OF PREFERRED EMBODIMENTS

As the examples of the operation provided hereinafter illustrate, the system of the invention comprises an intelligent system capable of quantitatively evaluating the behavior of the aircraft and its environmental parameters, of treating the corresponding data and generating a normalizing behavior which considerably simplifies the piloting and relieves the pilot of multiple tasks (tasks required by the ambient risks, the physical characteristics of the aircraft, . . . ). Such a system permits providing the aircraft with various equipment such as cameras for carrying out multiple missions (missions beyond view, reconnaissance, control, . . . ).

VARIATIONS DUE TO THE ENVIRONMENT: THE CASE OF A LATERAL GUST

The helicopter has a tendency to be inclined about the axis of roll. The beginning of inclination is detected by one of the gyrometers G (the roll gyrometer) and by the roll inclinometer I of the set of sensors IMAG of the on-board apparatus.

The gyrometer G furnishes, after demodulation in the gyroscopic demodulator DG, data representative of the angular speed about the rool axis and the inclinometer I furnishes data representative of the angular displacement about this axis.

This analog information is identified by its analog channel in order to know the source and to associate subsequently the appropriate operative program. This information is digitized in the converter A/DC and is then transmitted on the BUS$_{em}$ and stored in the volatile memory unit RAM$_{em}$.

The central unit ALU$_{em}$ calls on the corresponding working program in the non-volatile memory unit ROM$_{em}$ and the data itself in the memory unit RAM$_{em}$ in order to treat the latter.

This treatment is carried out with the help of a regulating algorithm loaded in the ROM$_{em}$.

The treated data is then transmitted by the BUS$_{em}$ to the converter unit D/A-PCM and the analog signal is shaped in the demodulator DEM in order to deliver the command on the analog channel of the roll servomotor and to carry out the necessary correction. The cycle proceeds until return to the pilot control.

The variations detected by the pitch gyrometers and the inclinometers of pitch and oscillations are treated in an analogous manner.

The variations in roll, pitch, oscillations, cyclic pitch, are treated simultaneously in an analogous manner.

If one of the parameters varies, the other parameters able to be affected by this variation are instantaneously taken into account and treated.

VARIATIONS DIRECTED BY THE PILOT

The pilot actuates the channel corresponding to the collective pitch toward the heading on the piloting console CP of the infrastructure.

The data corresponding to this command are in particular in the form PCM; they are transmitted to the analog digital conversion unit AD-PCM.

An algorithm, situated in the non-volatile memory unit $ROM_s$, is released upon the arrival of each pulse and proceeds to place the result in the volatile memory unit $RAM_s$ by the intermediary of the $BUS_s$.

A second algorithm also situated in the unit $ROM_s$, proceeds to read the contents of the unit $RAM_s$ placed by the first algorithm and transmits it to the asynchronous communication module $UART_s$; this latter transforms the data into a standard RS 232 serial signal. This signal is then modulated by the modulation/demodulation unit $MODEM_s$ and directed toward the radio module $HF_s$ and this, in order to be emitted by way of the antenna.

This signal is received on the helicopter antenna and enters into the radio transmission module $HF_e$. This signal is demodulated by the modulation/demodulation unit $MODEM_e$ and the signal issued from this treatment is presented at the input of the asynchronous communication module $UART_{em}$, the arrival of this signal releasing the regulation algorithm situated in the $ROM_{em}$ which interprets the signal and places it in the $RAM_{em}$. Then the algorithm integrates these signals with the data measured by the sensors and generates a result which is stored in the $RAM_{em}$.

A third algorithm goes to read the result of the regulation algorithm and places it at the input of the digital-/analog conversion unit DIA PCM. The composite signal issued by D/A PCM is broken down by the demodulator DEM into simple analog signals directly understandable by the servomotors.

All other variation induced by the manual piloting of the engine is taken into account by the calculator and is treated to retain the direction of the piloting.

INTERPRETATION OF DATA INDICATORS

The on-board indicators of the apparatus are in particular the altimeter L, speed indicator V and the indicators N (fuel gauge, alternator charging).

An algorithm situated in the $ROM_{em}$ unit proceeds to read the data sent by the indicators via the unit A/DE and places the result in the unit $RAM_{em}$ and doing this X times per second. Every n seconds, an algorithm situated in the unit $ROM_s$ sends an inquiry message via the unit $UART_s$, the unit $MODEM_s$ and the unit $HF_s$.

The message received by the unit $HF_e$ via the unit $MODEM_e$ and the unit $UART_{em}$ releases an algorithm in the unit $ROM_{em}$ which interprets the message received and proceeds to read the value registered in the unit $RAM_{em}$ and returns the response via the units $UART_{em}$, $MODEM_e$ and $HF_e$.

The message received on the ground by the unit $UART_s$ (via the units $HF_s$ and $MODEM_s$) releases an algorithm situated in the unit $ROM_s$ which displaced the result of the measurements in the unit $RAM_s$; the result is then sent to the multiprotocol communication unit SFR/PAR to be able to be interpreted for the peripherals HOST, PCI, TERM, PRN, in order to be displayed on the screen or printer.

NAVIGATION BY THE MODULE GPS

The data provided by the module GPS is sent on the $BUS_{ex}$ via the adaptation unit $DRIVER_{ex}$ and the communication module $UART_{ex}$. An algorithm situated in the $ROM_{ex}$ interprets these data and deduces by treatment via the unit $ALU_{ex}$ the constraints of the attitude of the helicopter as a function of the program of the route stored in the unit $RAM_{ex}$. (The altitude is the angular position of the helicopter with respect to the horizontal plane).

These constraints are sent on the interface units $UPI_{ex}$ and UPI to be interpreted by the stabilization algorithm situated in the unit $ROM_{em}$.

In the same manner and in the same time, the geographic coordinates of latitude and longitude issued from the module GPS are sent into the unit $RAM_{em}$. These geographic data are transmitted to the ground via the process which transmits the indicator data and this, in order to be able to visualize on the screen the displacement of the apparatus on the geographic map of the site of the flight.

At each moment, the operator on the ground may carry out a change of route and modify the program of the route stored in the unit $RAM_{ex}$ doing this in the following manner.

The operator starting from the unit PCI directs the change of route via the unit SER/PAR.

An algorithm situated in the unit $ROM_s$ takes the commands at the output of the unit SER/PAR and places them in the unit $RAM_s$.

A second algorithm placed in the unit $ROM_s$ proceeds to read the contents of the unit $RAM_s$ placed by the first algorithm and places it at the input of the unit $UART_s$ via the $BUS_s$.

The signal is sent via the units $MODEM_s$ and $HF_s$.

This signal received via the units $HF_e$, $MODEM_e$ and $UART_{em}$ released an algorithm in the unit $ROM_{em}$.

This latter treats, via the unit $ALU_{em}$, the data received and places it, via the interface units UPI and $UPI_{ex}$ into the program of the route situated, in the unit $RAM_{ex}$.

While this invention has been described as having certain preferred features and embodiments, it will be understood that it is capable of still further variation and modification without departing from the spirit of the invention, and this application is intended to cover any and all variations, modifications and adaptations of the invention as may fall within the spirit of the invention and the scope of the appended claims.

We claim:

1. A system for controlling a remote controlled aircraft equipped with servomotors for carrying out different functions, said system comprising a substructure for piloting from a distance and an on-board apparatus mounted on the aircraft, said piloting substructure comprising:
  a piloting console (CP) adapted to deliver analog piloting signals,
  an analog/digital conversion unit (A/D-PCM) for converting said piloting signals into digital data,
  a volatile memory unit ($RAM_s$) for storing the digital data,
  a central computing unit ($ALU_s$) for carrying out logical operations on the stored data according to predetermined operating programs, a non-volatile memory unit (ROM$_s$) containing the operating programs for the central unit (ALU$_s$), an asynchronous communication module (UART$_s$) adapted to transform the data issued from the computing unit into a serial signal, and for converting a serial signal received and loading the corresponding data into an internal register accessible by the central unit (ALU$_s$), a modulation/demodulation unit (MODEM$_s$) adapted to modulate the serial signal issued from the module (UART$_s$) and demodulate the modulated signals and transmit them to said module (UART$_s$), a radio transmitting/receiving module (HF$_s$) for amplifying and transmitting the modulated signals issued from the unit (MODEM$_s$) and receiving the modulated signals emitted by the on-board apparatus, a binary input/output port (DIO$_s$) driven or controlled by the central unit (ALU$_s$), a set of binary actuators and sensors (PANEL) states directed or controlled by the port (DIO$_s$), a series/parallel communication module (SER/PAR) adapted to provide exchanges of data between the central unit (ALU$_s$) and the peripherals, in particular a personal computer (PC$_1$), a pocket terminal (TERM), a printer (PRN), a host computer (HOST), said on-board apparatus comprising:

a radio transmitting/receiving module (HF$_e$), forming with the module (HF$_s$) a hertzian bundle, and adapted to transmit and receive modulated signals, a modulation/demodulation unit (MODEM$_{em}$) adapted to modulate a serial signal and transmit it to the module (HF$_e$), and the demodulate the signals coming from this module (HF$_e$), an asynchronous communication module (UART$_{em}$) adapted to transform data into a serial signal and transmit the same toward the unit (MODEM$_e$), and for converting the serial signal from the unit (MODEM$_e$) and loading the corresponding data into an internal register, a volatile memory unit (RAM$_{em}$) for storing the digital data, a central computing unit (ALU$_{em}$) for providing logical operations on the stored data, said unit having access to the internal register of the module (UART$_{em}$), a non-volatile memory unit (ROM$_{em}$) containing the operating programs for the central unit (ALU$_{em}$), a digital/analog conversion unit (D/A-PCM) adapted to generate a composite analog command signal from the data treated by the computing unit, a demodulator (DEM) adapted to receive the aforementioned composite signal and deliver to each servo-motor of the aircraft a simple analog signal understandable thereby, a binary input/output port (DIO$_{me}$) commanded or controlled by the central unit (ALU$_{me}$), an assembly of binary actuators and sensors (DACT) having states ordered or controlled by the port (DIO$_{me}$), an assembly of sensors (IMAG) comprising in particular inclinometers, a magnetometer, accelerometers, gyrometers, an altimeter, a speed indicator, tachometer, a fuel gauge, alternator load indicator, able to furnish analog signals representative of the position, operation and internal parameters of the aircraft, a multichannel analog/digital convertor (A/D$_e$) for converting the analog signals from the sensors (IMAG) into digital data and placing the data into the memory unit (RAM$_{em}$), a universal interface (UPI) for providing exchanges of data between the central unit (ALU$_{me}$) and the peripherals (AUX), in particular an auxiliary processor.

2. A control system as in claim 1, characterized in that said on-board apparatus comprises an auxiliary processor (AUX) connected to the universal interface (UPI) and comprising a computing unit (ALU$_{ex}$), a volatile memory unit (RAM$_{ex}$) for the storage of intermediate results, a non-volatile memory unit (ROM$_{ex}$) containing the operating programs for the computing unit (ALU$_{ex}$), an asynchronous communication module (UART$_{ex}$), an adapter unit (DRIVER$_{ex}$) adapted to assure compatibility between the communication module (UART$_{ex}$) and a geodesic data acquisition module (GPS).

3. A control system as in claim 1, characterized in that said remote piloting substructure and said on-board apparatus each comprise an adaptation module (DRIVER$_s$, DRIVER$_{em}$) for assuring compatibility between the communication module (UART$_s$, UART$_{me}$) and a personal computer (PC$_2$), for test verification.

4. A control system as in claim 1, characterized in that the piloting substructure comprises a screen management peripheral (SCREEN) connected to the central processing unit (ALU$_s$) for the visual display of data.

* * * * *